Patented Aug. 6, 1940

2,210,856

UNITED STATES PATENT OFFICE 2,210,856

FUDGE TYPE CANDY

Arthur P. Hellwig, Hartsdale, and Emil G. Fisher, New York, N. Y., assignors to American Maize-Products Company, a corporation of Maine No Drawing. Application July 19, 1938, Serial No. 220,000

4 Claims. (Cl. 99—134)

Our invention relates to candy products and processes of manufacture and more particularly to a powdered fudge mixture that is adapted to form an improved fudge type candy or fudge type icing upon the addition of water and slight cooking for a few minutes time.

The pre-prepared fudge candy and similar products heretofore proposed have been subject to several disadvantages and limitations which have restricted their satisfactory use on a large scale. Two of the principal defects with the prior products are, the necessity of pre-cooking and pre-graining the fudge, that is, to prepare the product initially in its final form; and the tendency of the fudge candy or fudge icing to dry out and become hard and brittle on short exposure.

The fudge products heretofore proposed are made substantially in the same manner that fudge candy is made by the housekeeper and then solidified, pulverized and dried to a substantially dry powdery form. To utilize this fudge powder it is necessary to add water, and fat and flavoring if these have not been previously added, and cook the mixture for a short time until a product of the desired consistency is obtained. In addition to the trouble and expense of first preparing the fudge product in substantially the same form in which it is again reconstituted by the user, the initial preparation must be very carefully carried out to insure proper texture or grain of the fudge. For example, if the process is not carried out with great care the mass will be disagreeably crystalline throughout, or if the product is cooked too long or at too high a temperature it will become excessively hard. Furthermore, if the product is "creamed" while too hot, the grain of the product will be too coarse. In view of all these difficulties it has been necessary heretofore to resort to certain cooling treatments after the candy has been prepared and before it is stirred or creamed.

The above described process steps of cooking, pre-graining, cooling, pulverizing and drying the fudge mixture before it is ready for packaging and sale require considerable time and labor. All of this detailed processing involves expense and renders the cost of production of the finished product relatively high.

The fudge candies and icings produced heretofore from the prepared mixtures have a comparatively very short life in use. For example, if fudge candy is made from the pre-prepared mixture, it tends to dry out to a hard crumbly state after exposure to the atmosphere for about a day or more. The fudge icings for cakes and the like are subject to this same disadvantage so that unless the product is eaten within a relatively short time after it is made, it will become so dry and stale that it is non-palatable and therefore of negligible sales value.

In accordance with our present invention, we have discovered a means for overcoming all of the objections characteristic of the prior art products and have produced a fudge mixture suitable for making fudge type candy or icings without the necessity of any pre-cooking of the material and at the same time providing a product that remains plastic and moist, that is, fresh, over markedly long periods of time. We have discovered that by introducing a portion of a new form of cereal sugars, known to the trade as "Dri-dex," into the fudge candy or icing mixture which contains sucrose or dextrose sugar, that all of the above mentioned disadvantages will be avoided. The product may be prepared by a simple admixing of all of the ingredients in dry form and therefore avoids the prior art processing difficulties and expense such as cooking, graining, cooling, pulverizing, etc.

Our new product may be prepared advantageously by first mixing the fat and the cereal sugars, Dridex. This procedure produces a thin film of fat over the Dridex particles and thereby controls moisture adsorption by the Dridex during storage. To this creamed mass of fat and cereal sugars are added the other ingredients normally required, namely, powdered milk, salt, flavoring and cocoa. This powdery mass is then screened to remove any lumps and is finally packed in suitable containers for storage and shipment. This dry product is adapted to be converted into fudge type candy or icing by the simple procedure of adding water and heating for a few minutes, such for example, as 3 or 4 minutes.

The new product of our invention is not cooked or subjected to artificial temperatures to any extent whatsoever before it is used, and it may be converted from its powdery form into the desired plastic form of fudge candy or icing by simple addition of a small amount of water and cooking of the mixture with stirring for a few minutes. The new form of cereal sugars, Dridex, used in this product is of such a nature that it insures the desired type of graining in the final product, without any pre-graining treatment. Furthermore, the Dridex is somewhat hygroscopic and non-efflorescent so that it provides and maintains permanently a suitable amount of moisture to keep the product in a plastic, fresh, palatable state. That is, neither the fudge candy nor icing will dry out and become powdery or hard even though it is exposed to the atmosphere for relatively long periods of time. For example, the product will still be fresh and palatable after exposure to air for a week or more, whereas similar products made heretofore with other materials would have become useless for edible purposes at the end of one or two days.

The cereal sugars or Dridex that we have found useful to provide the above described beneficial effects may be obtained according to several different procedures, such for example as those disclosed in copending applications Serial Nos. 163,257, 196,899 and 197,423. These sugars may be obtained for example by drying corn syrup to a relatively low and suitable moisture content and comminuting the solidified mass to produce a dried powdery material. This material contains less than about 4% moisture and usually about 2-3% moisture. When dehydrated to this extent the cereal sugar is sufficiently non-hygroscopic to permit handling and shipment without vacuum sealing. This is in distinct contrast to the highly hygroscopic corn syrup from which it is obtained. The dried sugar material which is in reality a dry starch conversion sugar product is non-efflorescent and therefore does not give up on standing its final moisture content of about 2% to 4%. Accordingly, when this material is substituted in part for the sucrose or dextrose normally used in fudge mixtures its retained moisture will keep the fudge mixture fresh and palatable over relatively long periods of time. Furthermore the cereal sugar being somewhat hygroscopic will take up sufficient moisture from the atmosphere to compensate for the small amount of moisture that may be lost upon long exposure.

The cereal sugars, or dried starch conversion syrup product, may vary widely in their composition. They consist primarily of dextrins and the reducing sugars, maltose and dextrose. The proportionate amount of these ingredients will vary in accordance with the degree of conversion of the starch syrup. The reducing sugar content calculated as dextrose may vary for example from about 15% to about 65%, the remainder of 65%—15% being dextrins. At the low conversion end the dextrins will predominate and in all cases some amount will be present in the cereal sugars. We believe that these dextrins play an important part in the efficient functioning of the cereal sugars product, Dridex, in our invention. A presently preferred form of Dridex for use in our invention contains approximately 15% dextrose, 43% maltose and 42% dextrins.

The amount of cereal sugars, Dridex, that may be used in accordance with our invention may be varied widely. A satisfactory operating range of percentage of Dridex by weight of the total composition is from about 2% to 12%. Amounts as small as 2% of Dridex when used in the regular fudge formulas will provide some of the benefits of our invention. In the usual case it will not be advisable to use more than about 12% of the Dridex in the fudge formula. A presently preferred percentage of Dridex is about 7.5%.

One illustrative but non-limiting example of the powdered fudge composition of our invention is as follows:

*Example*

| | | |
|---|---|---|
| Dridex | lbs | 25 |
| Powdered skim milk | lbs | 9 |
| Powdered sugar | lbs | 240 |
| Hydrogenated shortening | lbs | 25 |
| Salt | lb | 1 |
| Vanilla U. S. P | ozs | 8 |
| Powdered cinnamon | ozs | 4 |
| Cocoa | lbs | 20 |

The composition shown in the above example may be prepared as described above by first mixing the hydrogenated shortening and Dridex and then adding the remaining ingredients; or all of the above ingredients may be mixed together simultaneously. The mixing may be carried out in a large dough mixer for about 30 minutes time. The resulting mixture is then screened and packaged.

A specific but non-limiting example of the adaptation of the above final product as a cake icing is as follows:

About 12 ozs. of the powder is placed in a double boiler and 9 teaspoonfuls of boiling water are added to the powder. This mixture is cooked for approximately 3 minutes with constant stirring. The double boiler is removed from the fire and the mixture is stirred for sufficiently long time to give it the desired viscosity. For example, a viscosity such that it will not run when spread on a cake.

To prepare fudge type candy from our product, substantially the same procedure as described above for preparing the cake icing is followed, up to the point of the final stirring. In the case of fudge, the cooked mixture is stirred for a longer length of time, that is, until it is thick enough not to flow readily. The mixture is then poured into a shallow pan for cooling and solidifying.

For sake of clarity and simplicity the term "fudge" has been used in the claims herein to define generally the fudge type of candies and icings for cakes, and the like. The term is therefore used generically to cover various forms of the materials that may be produced from the powdered product of this invention.

The dried starch conversion syrup product or cereal sugars used in the composition of this invention may be dried to the solid form by proper spray drying treatment such as that disclosed in the above mentioned application Serial No. 196,899, filed June 29, 1939. When prepared in this manner the product is substantially in the form of hollow rounded particles. This product is known to the trade as "Fro-Dex."

Various modifications may be made in the constituents and proportions given in the above formula, and procedure, without departing from the scope of our invention, some of the novel features of which are defined in the appended claims.

We claim:

1. A composition for making substantially non-sticky, fine-grained fudge, comprising an uncooked blend of dry, discrete fine particles of solidified starch conversion syrup, and the usual sugar and other essential fudge constituents in predominantly separate particle forms without substantial agglomeration of the solidified syrup particles with the other constituents, said solidified syrup particles being physically dispersed throughout the blend and comprising about 15% to 65% maltose and dextrose and the remainder principally dextrins, the dispersed solidified syrup particles providing a porosity characteristic to the composition conducive to smooth fine-grained texture and inhibiting masking of the flavor and physical properties of the other constituents, said composition being further characterized by forming upon the addition of liquid and application of slight heat a true fudge which has a non-sticky but fine grained structure and which will maintain over a period of time substantially greater softness and freshness than fudge made with liquid corn syrup.

2. In a dry blend fudge composition containing the usual sugar, fat and other essential fudge ingredients in discrete solid particle form, the improvement of a substantial amount of dried solidified starch conversion syrup in separate fine particles substantially uniformly dispersed throughout the composition so as to provide substantially uniform porosity and inhibit agglomeration of the several ingredients with masking of their individual flavor and function, said solidified syrup having approximately 15% to 65% maltose and dextrose and the remainder principally dextrins.

3. A dry blend fudge composition as defined in claim 2 in which the solidified syrup particles are substantially spherical in shape.

4. A fudge composition comprising sucrose, fat, and a substantial amount of dried solidified starch conversion syrup in separate fine particles substantially uniformly dispersed throughout the composition, said solidified syrup having approximately 15% to 65% maltose and dextrose and the remainder principally dextrins.

ARTHUR P. HELLWIG.
EMIL G. FISHER.